(12) United States Patent
Voll et al.

(10) Patent No.: US 9,382,393 B2
(45) Date of Patent: Jul. 5, 2016

(54) PROCESS FOR PRODUCING WATER-ABSORBING POLYMER PARTICLES

(71) Applicant: BASF SE, Ludwigshafen (DE)

(72) Inventors: Norbert Eugen Voll, Worms (DE);
Oskar Stephan, Hockenheim (DE);
Karl J. Possemiers, Speyer (DE);
Matthias Weismantel,
Jossgrund-Oberndorf (DE); Rüdiger Funk, Niedernhausen (DE); Monte Peterson, Pearland, TX (US); Leo Van Miert, Kapellen (BE); Rene Callot, Ekeren (BE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/427,012

(22) PCT Filed: Sep. 19, 2013

(86) PCT No.: PCT/EP2013/069529
§ 371 (c)(1),
(2) Date: Mar. 10, 2015

(87) PCT Pub. No.: WO2014/044780
PCT Pub. Date: Mar. 27, 2014

(65) Prior Publication Data
US 2015/0315343 A1 Nov. 5, 2015

Related U.S. Application Data

(60) Provisional application No. 61/702,775, filed on Sep. 19, 2012.

(51) Int. Cl.
*C08F 2/00* (2006.01)
*F26B 19/00* (2006.01)
(Continued)

(52) U.S. Cl.
CPC ............... *C08J 5/00* (2013.01); *C08F 220/06* (2013.01); *F26B 25/00* (2013.01); *C08F 222/1006* (2013.01); *C08J 2333/02* (2013.01)

(58) Field of Classification Search
CPC .. C08F 220/06; C08F 222/1006; F26B 25/00; C08J 5/00; C08J 2333/02
USPC .......................................... 526/89; 34/236, 61
See application file for complete search history.

(56) References Cited

U.S. PATENT DOCUMENTS

| 4,666,983 A | 5/1987 | Tsubakimoto et al. |
| 4,734,478 A | 3/1988 | Tsubakimoto et al. |

(Continued)

FOREIGN PATENT DOCUMENTS

| DE | 3314019 A1 | 1/1984 |
| DE | 3523617 A1 | 1/1986 |

(Continued)

OTHER PUBLICATIONS

International Search Report and Written Opinion, International Application No. PCT/EP2013/069529, mailed Jan. 2, 2014.

(Continued)

*Primary Examiner* — William Cheung
(74) *Attorney, Agent, or Firm* — Marshall, Gerstein & Borun LLP

(57) ABSTRACT

The invention relates to a process for producing water-absorbing polymer particles, comprising polymerization and drying the resulting polymer gel on a through-circulation belt dryer having at the end of the belt in transport direction a means for guiding the dried polymer gel down towards a means for crushing the dried polymer gel.

24 Claims, 2 Drawing Sheets

(51) Int. Cl.
*F26B 25/00* (2006.01)
*C08J 5/00* (2006.01)
*C08F 220/06* (2006.01)
*C08F 222/10* (2006.01)

(56) References Cited

U.S. PATENT DOCUMENTS

| | | | |
|---|---|---|---|
| 5,409,771 | A | 4/1995 | Dahmen et al. |
| 5,837,789 | A | 11/1998 | Stockhausen et al. |
| 6,143,821 | A | 11/2000 | Houben |
| 6,239,230 | B1 | 5/2001 | Eckert et al. |
| 6,472,478 | B1 | 10/2002 | Funk et al. |
| 6,503,979 | B1 | 1/2003 | Funk et al. |
| 6,559,239 | B1 | 5/2003 | Riegel et al. |
| 6,657,015 | B1 | 12/2003 | Riegel et al. |
| 7,652,111 | B2 | 1/2010 | Hermeling et al. |
| 7,687,596 | B2 | 3/2010 | Hermeling et al. |
| 7,754,822 | B2 | 7/2010 | Daniel et al. |
| 7,772,420 | B2 | 8/2010 | Hermeling et al. |
| 8,361,926 | B2 * | 1/2013 | Tian ............... C08B 15/005 502/401 |
| 2011/0204288 | A1 * | 8/2011 | Funk ............... A61L 15/60 252/194 |

FOREIGN PATENT DOCUMENTS

| | | |
|---|---|---|
| DE | 3713601 A1 | 11/1988 |
| DE | 40 20 780 C1 | 8/1991 |
| DE | 19543368 A1 | 5/1997 |
| DE | 19646484 A1 | 5/1997 |
| DE | 198 07 992 C1 | 7/1999 |
| DE | 198 07 502 A1 | 9/1999 |
| DE | 1 98 54 573 A1 | 5/2000 |
| DE | 198 54 574 A1 | 5/2000 |
| DE | 10204938 A1 | 8/2003 |
| DE | 10331450 A1 | 1/2005 |
| DE | 10331456 A1 | 2/2005 |
| DE | 10334584 A1 | 2/2005 |
| DE | 10355401 A1 | 6/2005 |
| EP | 0 083 022 A2 | 7/1983 |
| EP | 0450922 A2 | 10/1991 |
| EP | 0547847 A1 | 6/1993 |
| EP | 559476 A1 | 9/1993 |
| EP | 0632068 A1 | 1/1995 |
| EP | 0530438 | 2/1997 |
| EP | 0937736 A2 | 8/1999 |
| EP | 1199327 A2 | 4/2002 |
| WO | WO-90/15830 A1 | 12/1990 |
| WO | WO-93/21237 A1 | 10/1993 |
| WO | WO-02/32962 A2 | 4/2002 |
| WO | WO-02/055469 A1 | 7/2002 |
| WO | WO-03/031482 A1 | 4/2003 |
| WO | WO-03/078378 A1 | 9/2003 |
| WO | WO-03/104299 A1 | 12/2003 |
| WO | WO-03/104300 A1 | 12/2003 |
| WO | WO-03/104301 A1 | 12/2003 |
| WO | WO-2004035514 A1 | 4/2004 |
| WO | WO-2011104152 A1 | 9/2011 |

OTHER PUBLICATIONS

Buchholz et al. (eds.), Modern Superabsorbent Polymer Technology, pp. 87-93 Wiley-VCH (1998).

* cited by examiner

PROCESS FOR PRODUCING WATER-ABSORBING POLYMER PARTICLES

CROSS-REFERENCE TO RELATED APPLICATIONS

This is the U.S. national phase of International Application No. PCT/EP2013/069529, filed Sep. 19, 2013, which claims the benefit of U.S. Provisional Application No. 61/702,775, filed Sep. 19, 2012, incorporated herein by reference in its entirety.

The invention relates to a process for producing water-absorbing polymer particles, comprising polymerization and drying the resulting polymer gel on a through-circulation belt dryer having at the end of the belt in transport direction a means for guiding the dried polymer gel down towards a means for crushing (crusher) the dried polymer gel.

Water-absorbing polymer particles are used to produce diapers, tampons, sanitary napkins and other hygiene articles, but also as water-retaining agents in market gardening. The waterabsorbing polymer particles are often also referred to as "absorbent resins", "superabsorbents", "superabsorbent polymers", "absorbent polymers", "absorbent gelling materials", "hydrophilic polymers" or "hydrogels".

The production of water-absorbing polymer particles is described in the monograph "Modern Superabsorbent Polymer Technology", F. L. Buchholz and A. T. Graham, Wiley-VCH, 1998, pages 71 to 103. A schematic drawing of a conventional through-circulation belt dryer having a crusher at the dryer exit can be found on page 89.

It was an object of the present invention to provide a process for producing water-absorbing polymer particles with reduced mechanical stress on the crusher at the end of the through circulation belt dryer.

The object was achieved by a process for producing water-absorbing polymer particles, comprising polymerization of a monomer solution or suspension, comprising
- a) at least one ethylenically unsaturated monomer which bears acid groups and may be at least partly neutralized,
- b) at least one crosslinker,
- c) at least one initiator,
- d) optionally one or more ethylenically unsaturated monomers copolymerizable with the monomers mentioned under a) and
- e) optionally one or more water-soluble polymers, drying, crushing, grinding and classifying the resulting polymer gel, optionally thermally postcrosslinking, wherein the polymer gel is dried on a through-circulation belt dryer having at a distance from 0.3 to 1.5 m from the end of the belt in transport direction a means for guiding the dried polymer gel down towards a means for crushing the dried polymer gel.

The present invention further provides a through-circulation belt dryer having at a distance from 0.3 to 1.5 m from the end of the belt in transport direction a means for guiding the dried product down towards a means for crushing the dried product.

These and other developed configurations of the invention are further outlined in the dependent claims. Thereby, the mentioned advantages of the proposed concept are even more improved.

The distance from the end of the belt in transport direction to the means for guiding the dried polymer gel is preferably from 0.4 to 1.2 m, more preferably from 0.5 to 1 m, most preferably from 0.55 to 0.8 m.

In a preferred development of the present invention, the means for guiding is a grid. In a more preferred embodiment of the present invention, the means for guiding is a grid made of tubular steel. The diameter of the tubular steel is preferably from 5 to 200 mm, more preferably from 20 to 100 mm, most preferably from 40 to 60 mm. The clearance between the tubular steel is preferably from 50 to 400 mm, more preferably from 75 to 300 mm, most preferably from 100 to 200 mm. In a most preferred development of the present invention, the means for guiding has a curved shape and/or slanted shape.

The means for crushing is not limited, a toothed roll is preferred.

It has been found as particular advantageous to provide an adjustment means to adjust the means for guiding the dried polymer gel. Adjusting can be variable and/or in dependence of a parameter, like e.g. a particle parameter or other parameter of the product preferably.

In a particular preferred development an adjustment means for adjusting the distance and/or the angle of the guiding means for guiding the dried polymer gel is provided such that the guiding means is adjustable relative to the end of the belt generally, in particular in one or more direction or orientation. The adjustment means can be set permanently for a certain period of time and/or the adjustment means can be actively or passively act on the guiding means. Each of the possibilities can be achieved in that an adjustment means comprises a number of arms wherein an arm is adapted to hold the guiding means. Preferably the arm is adapted to hold the guiding means at a holding position wherein the holding position is one of a number of optionally available holding positions provided by the arm. Particular preferably at least a first and a second arm is provided, in particular a third arm is provided. Preferably, by choosing different combinations of holding positions, a distance and/or angle of the guiding means can be varied.

Preferably the adjustment means is hold by a housing construction or a part of a housing construction.

Additionally or alternatively the adjustment means can be further equipped with any kind of driving means or the like actuating means for varying the position of the guiding means; e.g. in the form of a hydraulic, pneumatic or mechanic or electric or magnetic or electromagnetic driving means or the like actuating means. Using the driving means actively an "in process"-actuation and adjusting of the guiding means is possible. Additionally or alternatively it is preferred that the means for guiding the dried polymer gel as such can be adjusted in the process.

In a particular preferred development, the position of the guiding means relative to the end of belt is varied in dependence of the particle size, in particular, in dependence of the pre-crushed particle size and/or crushed particle size. Preferably a size of pre-crushed particles guided down towards the crusher means for crushing the dried polymer gel and/or a size of crushed particles crushed by the crusher means for crushing is determined. Particular preferably the adjusting step is or can be made dependent on a size of pre-crushed particles and/or on a size of crushed particles. In this particular preferred development it has been recognized that the size of particles can be optimized. This is advantageous also for the follow-up transportation of the particles resulting from the crushing step.

In particular, it has been found that the final size of crushed particles can already be influenced by the size of the pre-crushed particles. In a particular preferred development of the adjustment means and/or guiding means an adjustment is achieved to the advantage of the size of pre-crushed and/or crushed particles. In particular the pre-crushing behavior of the dried polymer gel can be optimized. In particular in this sense the particular preferred development provides an adjustable pre-crushing and/or crushing process step. Thereby, the final size of particles crushed can be optimized and/or are at least positively influenced.

Firstly these and similar developments provide advantages to the product itself.

Secondly these and similar developments also have advantages in the process. For instance, drying of the polymer gel can be adapted in a more flexible way as the crushing process is somewhat stabilized and/or optimized due to the adjusting step.

Thirdly transportation of crushed particles is improved as the size of particles is defined in a way that transportation is improved and/or clogging in the drying process and/or further transportation process step is avoided.

Fourthly the preferred development achieves to provide a process quality control. The inventive concept and developments thereof provide a contribution in favor of achieving a defined particle size in an improved way due to the pre-crushing, in particular due to the adjustable pre-crushing process step.

In a preferred development the distance of the guiding means from the end of the belt in transport direction can be varied in the range from 0.3 to 1.5 m in transport direction. Additionally or alternatively, the angle of the guiding means to the end of the belt in transport direction is varied in a range of 90° to 0° to the transport direction, in particular horizontal plane. The above-mentioned preferred developments each alone or both in combination can be preferably achieved with a slanted or curved shape of a guiding means.

According to a first particular preferred variant the adjustment means can be set permanently for a certain period of time.

According to a second preferred variant the adjustment means can be set by an active adjustment means.

In a third variant, the adjustment means can be a passive adjustment means. In particular, a passive adjustment means is useful to be implemented as a formable and thus adjustable guiding means. For instance, the guiding means as such can be formed in different fixed forms and/or at least partly in a flexible and/or resilient way.

Preferred is, additionally or alternatively, that the guiding means has a first and second part. Each for the first and/or second part can be of curved or of slanted shape. The second part of curved or slanted shape can be connected to the first part in a flexible way. Preferably, the connection has a pivot point. A pivot point is advantageous as the dried polymer gel to be guided by the guiding means can exert a force to the second part and thus the second part can react to the force in a resilient way; thereby an optimized guiding and crushing of the dried polymer gel down to the crusher can be achieved.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality.

Figure 1:
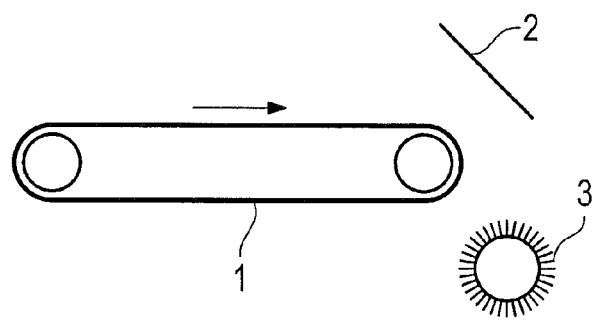
FIG. 1 shows a schematic drawing of a first preferred embodiment of a through-circulation belt dryer having a guiding means.

In the drawing, the reference symbols are defined as follows:
1 drying belt
2 guiding means
3 crusher
A diameter of the tubular steel
B clearance between the tubular steel During operation of the through-circulation belt dryer, the dried polymer gel stuck together to form a porous sheet. For further processing the sheets must be crushed. The present invention is based on the finding that sometimes very large sheets of dried polymer gel fall upon the crusher 3. Using a guiding device 2 at the end of the belt 1, the dried polymer gel is forced down without the possibility of forming oversized sheets.

Figure 2:
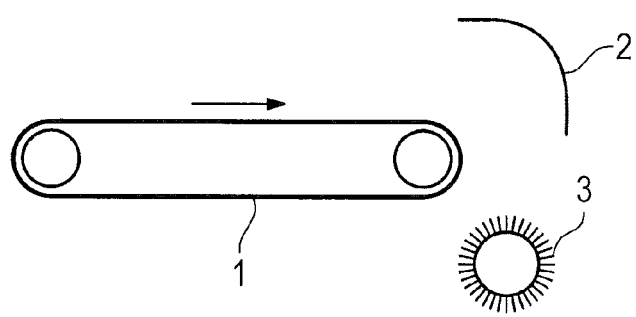
FIG. 2 shows a schematic drawing of a second preferred embodiment of a through-circulation belt dryer having a guiding means.

As shown in FIG. 1 a slanted guiding means 2 can be provided in a through circulation belt dryer 101. As shown in FIG. 2 a curved guiding means 2 can be provided in a through circulation belt dryer 102.

The production of the water-absorbing polymer particles is described in detail hereinafter:

The water-absorbing polymer particles are produced by polymerizing a monomer solution or suspension, and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water and most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 and comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, and preferably at least 10 ppm by weight, more preferably at least 30 ppm by weight and especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized freeradically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized freeradically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, poly-ethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight, more preferably 0.1 to 1% by weight and most preferably 0.3 to 0.6% by weight, based in each case on monomer a). With rising crosslinker content, the centrifuge retention capacity (CRC) falls and the absorption under a pressure of 21.0 g/cm2 passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. However, the reducing component used is preferably disodium 2-hydroxy-2-sulfonatoacetate or a mixture of disodium 2-hydroxy-2-sulfinatoacetate, disodium 2-hydroxy-2-sulfonatoacetate and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess monomer a), for example sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

For better control of the polymerization reaction, it is optionally possible to add all known chelating agents to the monomer solution or suspension or to the raw materials thereof. Suitable chelating agents are, for example, phosphoric acid, diphosphoric acid, triphosphoric acid, polyphosphoric acid, citric acid, tartaric acid, or salts thereof.

Further suitable examples are iminodiacetic acid, hydroxyethyliminodiacetic acid, nitrilotriacetic acid, nitrilotripropionic acid, ethylenediaminetetraacetic acid, diethylenetriaminepentaacetic acid, triethylenetetraaminehexaacetic acid, N,N-bis(2-hydroxyethyl)glycine and trans-1,2-diaminocyclohexanetetraacetic acid, and salts thereof. The amount used is typically 1 to 30 000 ppm based on the monomers a), preferably 10 to 1000 ppm, preferentially 20 to 600 ppm, more preferably 50 to 400 ppm, most preferably 100 to 300 ppm.

The monomer solution or suspension is polymerized. Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on the belt is described, for example, in DE 38 25 366 A1 and U.S. Pat. No. 6,241,928. Polymerization in a belt reactor forms a polymer gel which has to be comminuted in a further process step, for example in an extruder or kneader.

To improve the drying properties, the comminuted polymer gel obtained by means of a kneader can additionally be extruded.

The acid groups of the resulting polymer gels have typically been partially neutralized. Neutralization is preferably carried out at the monomer stage. This is typically accomplished by mixing in the neutralizing agent as an aqueous solution or preferably also as a solid. The degree of neutralization is preferably from 50 to 90 mol %, more preferably from 60 to 85 mol % and most preferably from 65 to 80 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The resulting polymer gel is dried on a through-circulation belt dryer until the residual moisture content is preferably 0.5 to 10% by weight, more preferably 1 to 7% by weight and most preferably 2 to 5% by weight, the residual moisture content being determined by EDANA recommended test method No. WSP 230.2-05 "Mass Loss Upon Heating". In the case of a too high residual moisture content, the dried polymer gel has a too low glass transition temperature $T_g$ and can be processed further only with difficulty. In the case of a too low residual moisture content, the dried polymer gel is too brittle and, in the subsequent crushing and grinding steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight. The dried polymer gel is crushed for pre-sizing. The crusher may be part of the through-circulation belt dryer.

Subsequently, the pre-sized polymer gel is ground and classified. The apparatus used for grinding may typically be single- or multistage roller mills, preferably two- or three-stage roller mills, pin mills, hammer mills or vibratory mills.

The mean particle size of the polymer particles removed as the product fraction is prefer-ably at least 200 pm, more preferably from 250 to 600 pm and very particularly from 300 to 500 pm. The mean particle size of the product fraction may be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 μm is preferably at least 90% by weight, more preferably at least 95% by weight, most preferably at least 98% by weight.

Polymer particles with a too small particle size lower the saline flow conductivity (SFC). The proportion of excessively small polymer particles ("fines") should therefore be low.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated for, for example, by adjusting the amount of crosslinker b) used.

When the excessively small polymer particles are added at a very late stage, for example not until an apparatus connected downstream of the polymerization reactor, for example an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 μm is preferably at least 90% by weight, more preferably at least 95% by weight, most preferably at least 98% by weight.

The proportion of particles having a particle size of at most 600 μm is preferably at least 90% by weight, more preferably at least 95% by weight, most preferably at least 98% by weight.

Polymer particles of excessively large particle size lower the free swell rate. The proportion of excessively large polymer particles should therefore likewise be small.

Excessively large polymer particles are therefore typically removed and recycled into the grinding of the dried polymer gel.

To improve the properties, the polymer particles may subsequently be thermally surface postcrosslinked. Suitable surface postcrosslinkers are compounds which comprise groups which can form covalent bonds with at least two acid groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface postcrosslinkers are cyclic carbonates in DE 40 20 780 C1, 2-oxazolidinone and derivatives thereof, such as 2-hydroxyethyl-2-oxazolidinone, in DE 198 07 502 A1, bis- and poly-2-oxazolidinones in DE 198 07 992 C1, 2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and derivatives thereof in WO 2003/031482 A1.

Preferred surface postcrosslinkers are ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyloxazolidin-2-one, oxazolidin-2-one and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably 0.001 to 2% by weight, more preferably 0.02 to 1% by weight and most preferably 0.05 to 0.2% by weight, based in each case on the polymer particles.

In a preferred embodiment of the present invention, polyvalent cations are applied to the particle surface in addition to the surface postcrosslinkers before, during or after the surface postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred. Apart from metal salts, it is also possible to use polyamines as polyvalent cations.

The amount of polyvalent cation used is, for example, 0.001 to 1.5% by weight, preferably 0.005 to 1% by weight and more preferably 0.02 to 0.8% by weight, based in each case on the polymer particles.

The surface postcrosslinking is typically performed in such a way that a solution of the surface postcrosslinker is sprayed onto the dried polymer particles. After the spray application, the polymer particles coated with surface postcrosslinker are dried thermally, and the surface postcrosslinking reaction can take place either before or during the drying.

The spray application of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The thermal surface postcrosslinking is preferably performed in contact driers, more preferably paddle driers, most preferably disk driers. Suitable driers are, for example, Hosokawa Bepex® Horizontal Paddle Dryer (Hosokawa Micron GmbH; Leingarten; Germany), Hosokawa Bepex® Disc Dryer (Hosokawa Micron GmbH; Leingarten; Germany) and Nara Paddle Dryer (NARA Machinery Europe; Frëchen; Germany). Moreover, fluidized bed driers may also be used.

The thermal surface postcrosslinking can be effected in the mixer itself, by heating the jacket or blowing in warm air. Equally suitable is a downstream drier, for example a shelf drier, a rotary tube oven or a heatable screw. It is particularly advantageous to effect mixing and drying in a fluidized bed drier.

Preferred surface postcrosslinking temperatures are in the range of 100 to 250° C., preferably 120 to 220° C., more preferably 130 to 210° C. and most preferably 150 to 200° C. The preferred residence time at this temperature in the reaction mixer or drier is preferably at least 10 minutes, more preferably at least 20 minutes, most preferably at least 30 minutes, and typically at most 60 minutes.

Subsequently, the surface postcrosslinked polymer particles can be classified again, excessively small and/or excessively large polymer particles being removed and recycled into the process.

To further improve the properties, the surface postcrosslinked polymer particles can be coated or remoisturized.

The remoisturizing is preferably performed at 30 to 80° C., more preferably at 35 to 70° C., most preferably at 40 to 60° C. At excessively low temperatures, the water-absorbing polymer particles tend to form lumps, and, at higher temperatures, water already evaporates to a noticeable degree. The amount of water used for remoisturizing is preferably from 1 to 10% by weight, more preferably from 2 to 8% by weight and most preferably from 3 to 5% by weight. The remoisturizing increases the mechanical stability of the polymer particles and reduces their tendency to static charging.

Suitable coatings for improving the free swell rate and the saline flow conductivity (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The water-absorbing polymer particles produced by the process according to the invention have a centrifuge retention capacity (CRC) of typically at least 15 g/g, preferably at least 20 g/g, more preferably at least 22 g/g, especially preferably at least 24 g/g and most preferably at least 26 g/g. The centrifuge retention capacity (CRC) of the water-absorbing polymer particles is typically less than 60 g/g. The centrifuge retention capacity (CRC) is determined by EDANA recommended test method No. WSP 241.2-05 "Fluid Retention Capacity in Saline, After Centrifugation".

The water-absorbing polymer particles produced by the process according to the invention have an absorption under a pressure of 49.2 g/cm2 of typically at least 15 g/g, preferably at least 20 g/g, more preferably at least 22 g/g, especially preferably at least 24 g/g and most preferably at least 26 g/g. The absorption under a pressure of 49.2 g/cm$^2$ of the water-absorbing polymer particles is typically less than 35 g/g. The absorption under a pressure of 49.2 g/cm$^2$ is determined analogously to EDANA recommended test method No. WSP 242.2-05 "Absorption under Pressure, Gravimetric Determination", except that a pressure of 49.2 g/cm$^2$ is established instead of a pressure of 21.0 g/cm$^2$.

EXAMPLES

Example 1 (Comparative Example)

In a production of water-absorbing polymer particles a through-circulation belt dryer was used for drying the formed polymer gel. During operation, sometimes sheets of dried polymer gel having a width of 4.27 m (the width of the drying belt) and a depth of 1,5 m fall on the crusher at the end of the drying belt.

Example 2

Figure 3:
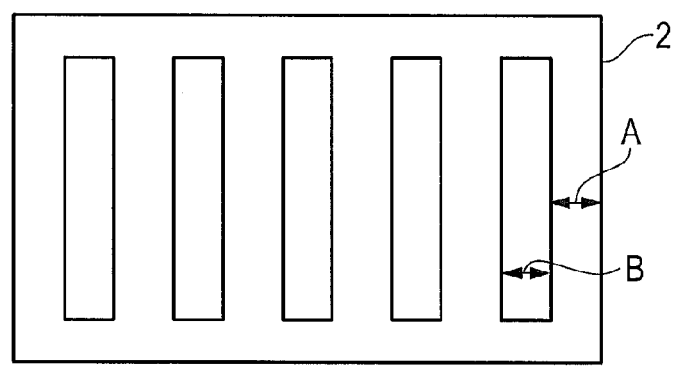
FIG. 3 shows a schematic drawing of a grid, made of tubular steel.

To the conventional through-circulation belt dryer that was used in Example 1 in a through-circulation belt dryer 103 a curved grid made of tubular steel as shown in FIG. 3 was added as guiding means for the dried polymer gel. The diameter A of the tubular steel was 44.5 mm, the clearance B between the tubular steel was 157 mm, and the distance between the guiding means 2 and the end of the belt 1 in transport direction was 0.6 m. The curved grid had the shape of a quarter of a cycle with a radius of 683 mm.

A planar grid made of tubular steel as shown in FIG. 3 was connected with the lower end of the curved grid. The diameter A of the tubular steel was 44.5 mm, the clearance B between the tubular steel was 157 mm, and the length of the planar grid was 603 mm. During operation, the depth of the sheets of dried polymer gel that fall on the crusher 3 at the end of the drying belt 1 was less than 0.6 m.

Figure 4:
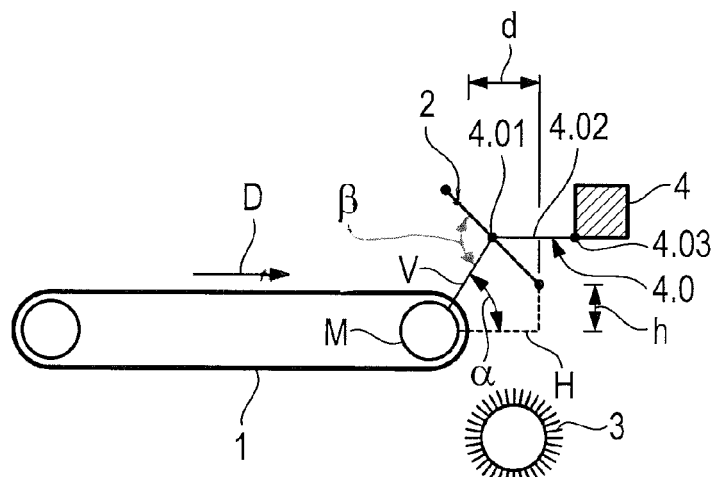
FIG. 4 shows a schematic drawing of a first varied embodiment of a through-circulation belt dryer having an adjustable guiding means based on the first preferred embodiment.

FIG. 4 shows a varied embodiment of the through circulation belt dryer of FIG. 1 wherein in in the through circulation belt dryer 104 the guiding means 2 has a slanted shape with basically flat linear extension. The distance d here is defined between the end of belt 1 and the end of guiding means 2. An angle α is defined between the mid-vertical V—from the middle point of the flat linear extension of the guiding means 2 to the end roll of the drying belt 1—and a horizontal plane H. The angle α is adjustable in the range of 90° and 0°.

Also shown in principle in FIG. 4 is an adjustment means 4 holding the guiding means 2 wherein in this case the guiding means 2 is connected to a single arm 4.0 between the adjustment means 4 and the guiding means 2. The arm 4.0 provides a number of three holding positions 4.01, 4.02, 4.03 wherein in this case the guiding means 2 is connected to the arm 4.0 at the outermost holding position 4.01. Alternatively, for variable adjustment, the guiding means 2 could also be connected to the arm 4.0 at one of the other holding positions 4.02 or 4.03. As exemplified in this example, preferably the arm 4.0 is adapted to vary the distance d between the end of belt 1 and the end of guiding means 2. The arm 4.0 can be connected or can be part of a housing construction to hold the guiding means 2.

Optionally the arm 4.0 can be adapted to have pivot means to provide a pivotal connection point at one of the holding positions 4.01, 4.02, 4.03. Thereby an angle β between the mid-vertical V and the flat linear extension of the guiding means 2 can be made directly adjustable.

Optionally, as also exemplified in this embodiment, the arm 4.0 as such can be made pivotal at the holding position 4.03 relative to the adjustment means 4. Thereby the angle α between the mid-vertical V and the horizontal plane H can be made adjustable and also the height h of the guiding means end can be varied.

In summary, according to the first varied embodiment shown in FIG. 4, a deflection angle of the guiding means 2 relative to the transport direction D of the dried polymer gel can be adjusted in an optimized way by one or more of the options outlined above alone or in combination to allow particular preferred guiding of the dried polymer gel down towards the crusher means 3. Preferably an optimized pre-crushing process step is provided when the dried polymer gel ejected from the belt 1 hits the guiding means 2 can be achieved.

Figure 5:
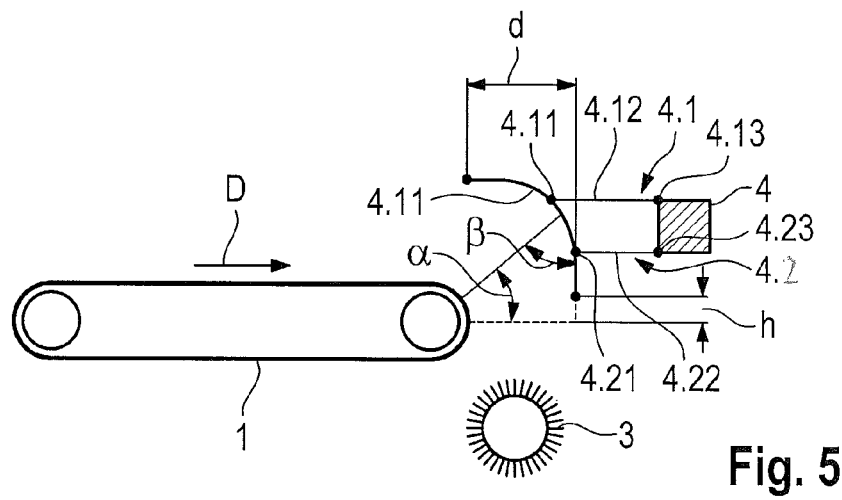
FIG. 5 shows a schematic drawing of a second varied embodiment of a through-circulation belt dryer having an adjustable guiding means based on the second preferred embodiment.

FIG. 5 shows a varied embodiment of the second embodiment as shown in FIG. 2 wherein in the through circulation belt dryer 105 the guiding means 2 is of curved shape; the shape is of basically round extension of a circle's quarter with flat elongations at each end or at least one of the ends; in this embodiment the lower end has a flat elongation. The distance d of the guiding means 2 to the end of belt 1 can be adjusted. The distance d is defined as the distance between the outer end of belt 1 and the outer end of the curved shaped guiding means 2 in respect to the transport direction D. Here optionally also the height h, as defined between the horizontal plane H and the lowermost end of the curved shaped guiding means 2 is adjustable in this second varied embodiment.

In this second varied embodiment an adjustment means 4 is provided with a first and a second arm 4.1, 4.2, wherein the first arm 4.1 provides a first number of three holding positions 4.11, 4.12, 4.13 and the second arm 4.2 provides a second number of three holding positions 4.21, 4.22, 4.23. In the example shown in FIG. 5 the guiding means 2 has a curved shape curved part and at its curved part is connected to the outermost first holding position 4.11 of the first arm and the outermost further first holding position 4.21 of the second arm 4.2. To vary one or all or a selection of the parameters selected from the group consisting of: distance d, height h, first angle α, second angle β, the holding positions used for connection of the guiding means 2 can be changed.

As a first example for instance, the guiding means 2 can be connected to the first holding position 4.11 of the first arm 4.1 and can be connected to the further second holding position 4.22 of the second arm 4.2. Thereby the angle β would be increased and the distance d would be increased and the height h would be increased, whereas the angle α, would be basically the same as compared to the situation of FIG. 5.

Further, as a second example for instance, the guiding means 2 could be connected at the second holding position 4.12 of the first arm and the further second holding position 4.22 of the second arm. Thereby the height h and the angles α, β would be kept unchanged. However, the distance d would be changed.

Here—in particular without the need of providing a pivot means—the deflection properties of the guiding means 2 can be adapted to the demands of pre-crushing and deflecting the dried polymer gel ejected from the belt in the transport direction D. The arm 4.0 can be connected or can be part of a housing construction to hold the guiding means 2.

Figure 6:
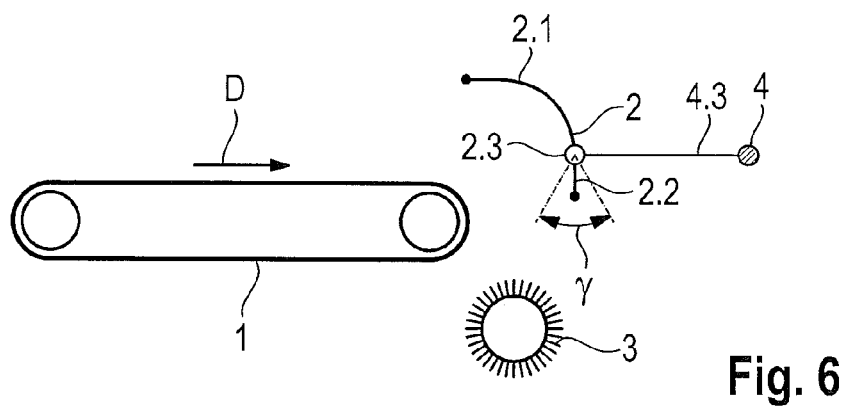
FIG. 6 shows a schematic drawing of a third varied embodiment of a through-circulation belt dryer having an adjustable guiding means based on the second preferred embodiment.

FIG. 6 shows a further varied embodiment based on the second embodiment shown in FIG. 2 wherein in the through circulation belt dryer 106 the guiding means 2 has an upper curved part 2.1 and a lower pivotal part 2.2 connected to the first part 2.1 at a pivotal hinge 2.3. Once hit by the dried polymer gel in the transport direction D the second part 2.2 deflects the dried polymer gel ejected in the transport direction and exerts a counter-force in a resilient way as the second part 2.2 is pivotal in the range of a pivot angle of γ, namely here for instance in a range of +/−45°. The guiding means 2 of FIG. 6 provides a passively actuable adjusting.

Optionally also an adjustment means 4 is provided, wherein in this optional case an arm 4.3 of the adjustment means 4 is connected to the pivotal hinge 2.3 of the guiding means 2. At the distal end of the arm 4.3, for instance, a means for adjusting a resilient force can be provided and thus the deflection force of the lower pivotal part 2.2 can be adapted to the demands of the force exerted by the ejected dried polymer gel in the transport direction D. Also a pre-crushing demand can be observed when adapting the means for adjusting a resilient force. For instance, a screw can be provided between the distal end of the arm 4.3 to tighten or loosen the pivotal hinge 2.3.

Optionally also the guiding means 2 of FIG. 4, FIG. 5 and FIG. 6 can be actuated in adjusting the first angle α and/or the second angle β and/or the third angle γ and/or the distance d and/or the height h by means of an active actuating means like a motor or the like.

Here and before for identical or similar features or features of identical or similar function the same reference marks are used. In the following a more detailed form of a through-circulation belt dryer is described with a belt 1, a guiding means 2 and a crusher means 3, which can be used in combination with the principle of embodiments as outlined above.

The guiding means is preferably part of a through-circulation belt dryer 101, 102, 103, 104, 105, 106. The through-circulation belt dryer has a drying belt 1 which is looped around an end roll in an end chamber of an end region. The end chamber provides a housing with a housing construction and a housing cover. The guiding means 2 is preferably provided at a distance from 0.3 to 1.5 m from the end of the belt in transport direction D for guiding dried polymer gel down towards the crusher means 3. The guiding means 2 in this embodiment is made as a grid of curved shape. The crusher means 3 is placed in a funnel wherein the crusher means 3 and the funnel directly or indirectly are connected to a bearing part.

In the end region with the adjustable guiding means 2 in more detail and the belt 1 in more detail the belt 1 is provided with a number of belt plates wherein each belt plate is combined with a side barrier; the side barrier is adapted for retention of dried polymer gel on the belt, in particular is adapted for retention of dried polymer gel on the belt plates.

The guiding means 2 is formed as a grid construed from basically unidirectional grid poles, which in this embodiment are formed as a number of curved tubular elongated elements. The guiding means 2 also provides a first and a second and a third co-parallel grid bar wherein the number of curved tubular elongated elements are connected to the first and second and third bar; thus an outer circumferential curved face of the grid is outlined by the curved tubular elements, wherein the circumferential curved face is formed basically on the surface of a quarter circle; thus the curved part of the tubular elongated elements also basically follows the form of a quarter circle.

The instant embodiment is meant to be exemplifying. The number of three bars is not restricted. In particular also further bars can be provided on the quarter circle shaped surface face of the grid. Also the number of curved tubular elements can be varied. Also in an alternative the curved tubular elements can be replaced by a mesh or combined with a mesh; for instance a mesh can be provided in between neighboring or on top of all curved tubular elements. For instance, a wire or filament mesh can be provided on the quarter circle surface. Also the form of a quarter circle surface is not in first essential; any other kind of circle-like, elliptic-like or slanted or curved-like surface can be provided for placement of a grid of the guiding means 2.

In a side cross-sectional view to the end region giving view into the inside of the end chamber the side of the belt guided downwardly provides a belt guidance for leading back the belt 1 out of the end chamber. The crusher means 3 is a toothed roll with a number of teeth on a shaft connected to the bearing mentioned before.

The guiding means 2 follows the cross-section of a curved tubular elements in cross-sectional view wherein a quarter-circle shaped upper part and a vertically arranged basically flat lower end part are both connected to the second bar to provide a curved tubular element of the guiding means 2 (similar to the embodiment shown in principle in FIG. 5).

An adjustment means 4 is provided and—as basically described with FIG. 5—here the adjustment means 4 is connected to the housing construction of the housing of the end region of the through-circulation belt dryer.

At an upper end point uP of the guiding means 2 the first bar is provided for cross-connection of the tubular elements. At a middle point mP the second bar is provided for cross-connection of the curved tubular elements of the quarter-circle shaped upper part and for connecting a straight vertical part or straight vertical tubular element of the second part of the guiding means 2. At a lower point IP of the guiding means 2 a third cross-connecting bar is provided for cross-connection of the straight tubular elements of the guiding means 2.

Each of the cross-connecting bars at points uP, mP, IP are held by an arm. An arm here is formed as a construction profile of the adjustment means, wherein each of the first, second and third construction profiles has a number of holding positions, namely a first number of holding positions and respectively a second number of holding positions and respectively a third number of holding positions. Each of the holding positions is adapted to provide a holding means for holding one of the cross-connecting bars. By using a varied combination of holding positions for connecting the cross bars an adapted angle α, β and/or height h or distance d as described with FIG. 4 to FIG. 6 mentioned herein before can be provided for adjusting deflection properties of the guiding means 2.

The invention also extends to a list of embodiments as follows:
1. A process for producing water-absorbing polymer particles, comprising polymerization of a monomer solution or suspension, comprising:
a) at least one ethylenically unsaturated monomer which bears acid groups and may be at least partly neutralized, b) at least one crosslinker,
c) at least one initiator,
d) optionally one or more ethylenically unsaturated monomers copolymerizable with the monomers mentioned under a) and
e) optionally one or more water-soluble polymers, drying, crushing, grinding and classifying the resulting polymer gel, optionally thermally postcrosslinking, wherein the polymer gel is dried on a through-circulation belt dryer having at a distance from 0.3 to 1.5 m from the end of the belt in transport direction a means for guiding the dried polymer gel down towards a means for crushing the dried polymer gel.

2. The process according to embodiment 1, wherein the distance from the end of the belt in transport direction to the means for guiding the dried polymer gel is from 0.5 to 1 m.

3. The process according to embodiment 1 or 2, wherein the means for guiding the dried polymer gel is a grid.

4. The process according embodiment 3, wherein the grid is made of tubular steel.

5. The process according to any of embodiments 1 to 4, wherein on the longitudinal view of the through-circulation belt dryer the means for guiding the dried polymer gel has a curved shape.

6. The process according to any of embodiments 1 to 5, wherein the means for crushing the dried polymer gel is a toothed roll.

7. The process according to any of embodiments 1 to 6, wherein the proportion of acrylic acid in the total amount of ethylenically unsaturated monomer a) is at least 95 mol %.

8. The process according to any of embodiments 1 to 7, wherein the degree of neutralization of the ethylenically unsaturated monomer a) is from 65 to 80 mol %.

9. The process according to any of embodiments 1 to 8, wherein the water-absorbing polymer particles have a centrifuge retention capacity of at least 15 g/g.

10. A through-circulation belt dryer having at a distance from 0.3 to 1.5 m from the end of the belt in transport direction a means for guiding the dried product down towards a means for crushing the dried product.

11. The through-circulation belt dryer according to embodiment 10, wherein the distance from the end of the belt in transport direction to the means for guiding the dried polymer gel is from 0.5 to 1 m.

12. The through-circulation belt dryer according to embodiment 10 or 11, wherein the means for guiding the dried product is a grid.

13. The through-circulation belt dryer according to embodiment 12, wherein the grid is made of tubular steel.

14. The through-circulation belt dryer according to any of embodiments 10 to 13, wherein on the longitudinal view of the through-circulation belt dryer the means for guiding the dried product has a curved shape.

15. The through-circulation belt dryer according to any of embodiments 10 to 14, wherein the means for crushing the dried product is a toothed roll.

The invention claimed is:

1. A process for producing water-absorbing polymer particles, comprising polymerization of a monomer solution or suspension, comprising:
   a) at least one ethylenically unsaturated monomer which bears an acid group and may be at least partly neutralized,
   b) at least one crosslinker,
   c) at least one initiator,
   d) optionally one or more ethylenically unsaturated monomer copolymerizable with the monomer mentioned under a), and
   e) optionally one or more water-soluble polymer, drying, crushing, grinding, and classifying a resulting polymer gel, and optionally thermally postcrosslinking, wherein the polymer gel is dried on a through-circulation belt dryer having a drying belt, a guide for guiding the dried polymer gel, and a crusher for crushing the dried polymer gel, wherein the guide for guiding the dried polymer gel is at a distance from 0.3 to 1.5 m from an end of the belt in a transport direction, the guide for guiding the dried polymer gel guides the dried polymer gel down towards the crusher for crushing the dried polymer gel.

2. The process according to claim 1, wherein the distance from the end of the belt in transport direction to the guiding means for guiding the dried polymer gel is from 0.5 to 1 m.

3. The process according to claim 1, wherein the crusher for guiding the dried polymer gel guides the dried polymer gel down towards the guide for crushing the dried polymer gel and upon guiding, the dried polymer gel is precrushed by the guide for guiding the dried polymer gel to form precrushed particles to be received by the crusher for crushing.

4. The process according to claim 1, wherein a size of crushed particles crushed by the crusher for crushing is determined.

5. The process according to claim 1, wherein the guide for guiding the dried polymer gel as such and/or the distance and/or the angle of the guide for guiding the dried polymer gel is adjusted.

6. The process according to claim 1, wherein adjusting is variable and/or depending on a size of crushed particles.

7. The process according to claim 1, wherein the guide for guiding the dried polymer gel as such and/or the distance and/or an angle of the guide for guiding the dried polymer gel is adjusted such that
   a distance of the guide for guiding the dried polymer gel from the end of the belt in transport direction is varied in the range from 0.3 to 1.5 m in transport direction, and/or
   an angle of the guide for guiding the dried polymer gel to the end of the belt in transport direction is varied in a range of 90° to 0° to the transport direction.

8. The process according to claim 1, wherein a proportion of acrylic acid in the total amount of ethylenically unsaturated monomer a) is at least 95 mol %.

9. The process according to claim 1, wherein a degree of neutralization of the ethylenically unsaturated monomer a) is from 65 to 80 mol %.

10. The process according to claim 1, wherein the water-absorbing polymer particles have a centrifuge retention capacity of at least 15 g/g.

11. A through-circulation belt dryer adapted for drying a polymer gel resulting from a process of producing water-absorbing polymer particles, comprising polymerization of a monomer solution or suspension, and adapted for crushing a dried polymer gel, the through-circulation belt dryer having a drying belt, a guide for guiding the dried polymer gel, and a crusher for crushing the dried polymer gel, wherein the guide for guiding the dried polymer gel is at a distance from 0.3 to 1.5 m from an end of the belt in transport direction, the guide for guiding the dried polymer gel guides the dried polymer gel down towards the crusher for crushing the dried polymer gel.

12. The through-circulation belt dryer according to claim 11, wherein the distance from the end of the belt in transport direction to the guide for guiding the dried polymer gel is from 0.5 to 1 m.

13. The through-circulation belt dryer according to claim 11, wherein the guide for guiding the dried product is a grid.

14. The through-circulation belt dryer according to claim 13, wherein the grid is made of tubular steel.

15. The through-circulation belt dryer according to claim 11, wherein on a longitudinal view of the through-circulation belt dryer, the guide for guiding the dried product has a curved shape and/or a slanted shape.

16. The through-circulation belt dryer according to claim 11, wherein the guide for guiding the dried polymer gel as such is adjustable.

17. The through-circulation belt dryer according to claim 11, wherein the guide for guiding the dried polymer gel provides a curved shape first part and a slanted shape second part connected to the first part.

18. The through-circulation belt dryer according to claim 11, wherein the distance and/or the angle of the guide for guiding the dried polymer gel is adjustable relative to the end of the belt by an adjustment adjustment arms.

19. The through-circulation belt dryer according to claim 11, wherein
the guide for guiding the dried polymer gel as such and/or its distance is adjustable in an axial direction to adjust the distance in the transport direction in the range of 0.3 to 1.5 m in the transport direction and/or
the guide for guiding the dried polymer gel as such and/or its angle is adjustable in a radial direction to adjust an angle to the transport direction transport direction in the range of 90° to 0°.

20. The through-circulation belt dryer according to claim 11, wherein adjustment arms for adjusting the distance and/or the angle of the guide for guiding the dried polymer gel relative to the end of the belt, comprises a number of arms, wherein an arm as adapted to hold the guide at a holding position, and wherein the holding position is one of a number of optionally available holding positions provided by the arm.

21. The through-circulation belt dryer according to claim 11, wherein the crusher for crushing the dried product is a toothed roll.

22. The process according to claim 3, wherein a size of precrushed particles guided to work the crusher for crushing the dried polymer gel is determined.

23. The process according to claim 5, wherein adjusting is variable and/or depends on a size of the precrushed particles.

24. The through-circulation belt dryer according to claim 17, wherein the second part of the guide is pivotal connected to the first part.

* * * * *